(12) United States Patent
Nielsen et al.

(10) Patent No.: US 6,699,447 B1
(45) Date of Patent: Mar. 2, 2004

(54) SODIUM BICARBONATE PRODUCTION FROM NAHCOLITE

(75) Inventors: Kurt R. Nielsen, Glenwood Springs, CO (US); Leo G. Cirotski, Franklin, MA (US); Allan L. Turner, Lakewood, CO (US)

(73) Assignee: American Soda, LLP, Parachute, CO (US)

( * ) Notice: Subject to any disclaimer, the term of this patent is extended or adjusted under 35 U.S.C. 154(b) by 0 days.

(21) Appl. No.: 09/540,658

(22) Filed: Mar. 31, 2000

Related U.S. Application Data (63) Continuation-in-part of application No. 09/480,092, filed on Jan. 10, 2000.
(60) Provisional application No. 60/127,795, filed on Mar. 31, 1999, and provisional application No. 60/115,184, filed on Jan. 8, 1999.

(51) Int. Cl.[7] ................................................. C01D 7/50
(52) U.S. Cl. ........................ 423/184; 423/195; 423/422
(58) Field of Search ................ 423/184, 195, 423/196, 422, 206.2; 299/4, 5; 23/302 T (56) References Cited

U.S. PATENT DOCUMENTS

| | | |
|---|---|---|
| 3,451,767 A | 6/1969 | Saeman et al. |
| 3,482,934 A | 12/1969 | Di Bello et al. |
| 3,506,432 A | 4/1970 | Arita |
| 3,653,847 A | 4/1972 | Ableson |
| 3,779,602 A | * 12/1973 | Beard et al. ............ 299/5 |
| 3,780,160 A | 12/1973 | Waggener et al. |
| 3,855,397 A | 12/1974 | Hoffman et al. |
| 3,870,784 A | 3/1975 | Saeman |
| 3,944,474 A | 3/1976 | Verlaeten |
| 3,962,403 A | 6/1976 | Wyslouzil |
| 4,062,926 A | 12/1977 | Knight |
| 4,138,312 A | 2/1979 | Gill et al. |
| 4,234,230 A | 11/1980 | Weichman |
| 4,252,781 A | 2/1981 | Fujita et al. |
| 4,283,372 A | 8/1981 | Frint et al. |
| 4,285,547 A | 8/1981 | Weichman |
| 4,291,002 A | 9/1981 | Arnold et al. |
| 4,344,650 A | 8/1982 | Pinsky et al. |
| 4,459,272 A | 7/1984 | Kreig et al. |
| 4,478,599 A | 10/1984 | Puri et al. |
| 4,557,910 A | 12/1985 | Meadow |
| 4,564,508 A | 1/1986 | Fairweather et al. |
| 4,654,204 A | 3/1987 | Copenhafer et al. |
| 4,815,790 A | 3/1989 | Rosar et al. |
| 5,262,134 A | 11/1993 | Frint et al. |
| 5,270,023 A | 12/1993 | May et al. |
| 5,275,794 A | 1/1994 | Luna |
| 5,288,472 A | 2/1994 | Ruiz |
| 5,290,322 A | 3/1994 | Breton et al. |
| 5,588,713 A | 12/1996 | Stevenson |
| 5,609,838 A | 3/1997 | Neuman et al. |
| 5,618,504 A | 4/1997 | Delling et al. |
| 5,654,351 A | 8/1997 | Kresnyak et al. |

OTHER PUBLICATIONS

M. Prats et al. "Soluble –Salt Processes for In–Situ Recovery of Hydrocarbons From Oil Shale," *Journal of Petroleum Technology*, 1078–88 (Sep., 1977).

* cited by examiner

Primary Examiner—Steven Bos
(74) *Attorney, Agent, or Firm*—Merchant & Gould P.C.

(57) ABSTRACT

A method for producing sodium bicarbonate from a nahcolite deposit comprising injecting water or other aqueous solution at a temperature of at least 250° F. into the deposit, dissolving sodium bicarbonate in the hot water to form a production solution and subjecting the production solution to multiple stages of crystallization. The sodium bicarbonate crystals may be dewatered and dried to form a commercial sodium bicarbonate product.

26 Claims, 7 Drawing Sheets

FIGURE 2
AMERICAN SODA, LLP
SODIUM BICARBONATE PRODUCTION

AMERICAN SODA, LLP
WELL CROSS SECTIONS

FIGURE 3A
CROSS SECTION DETAIL A-A'

FIGURE 3B
CROSS SECTION DETAIL A-A'

FIGURE 3C
CROSS SECTION DETAIL A-A'

FIGURE 3D
CROSS SECTION DETAIL A-A'

NOTE: SEE FIGURE 3E FOR VERTICAL VIEW

NOT TO SCALE

FIGURE 6
AMERICAN SODA, LLP
PRESSURE REQUIRED TO PREVENT DECOMPOSITION OF SATURATED SODIUM BICARBONATE SOLUTION

SODIUM BICARBONATE PRODUCTION FROM NAHCOLITE

This application is a continuation-in-part of U.S. patent application Ser. No. 09/480,092 filed Jan. 10, 2000, which claims the benefit of provisional patent application No. 60/115,184 filed Jan. 8, 1999. This application also claims the benefit of provisional patent application No. 60/127,795 filed Mar. 31, 1999.

I. FIELD OF THE INVENTION

The invention relates to the solution mining of nahcolite, an ore consisting primarily of sodium bicarbonate, to produce sodium bicarbonate ("bicarb").

II. BACKGROUND OF THE INVENTION

There have been a number of prior art processes attempting to recover bicarb from nahcolite deposits. We have now found that the process of producing this compound by solution mining of nahcolite deposits at high temperatures is more economical and has a number of other advantages. In particular, the present invention involves the in situ solution mining of nahcolite using high temperature (i.e., above 250° F.), high pressure water and the subsequent processing of the production solution to produce bicarb. The invention enables bicarb to be economically recovered, not only from beds of virtually pure nahcolite, but also from oil shale containing much smaller amounts of nahcolite embedded therein.

Prior to this invention, no one had appreciated the benefits that could be achieved through the high temperature solution mining of nahcolite and the recovery of sodium bicarbonate. Indeed, prior art processes utilized solution mining temperatures below 250° F. and preferably below 200° F. (See, e.g., U.S. Pat. No. 4,815,790 to Rosar et al. and assigned to NaTec, Ltd.). Others advocated adding acid to the injection solution to effect a reaction in the ore body that produced an alkali species with higher solubility. For example U.S. Pat. No. 4,475,771 (assigned to Duval Corp.) advocated the use of hydrochloric acid, and U.S. Pat. Nos. 4,358,158 and 4,358,157 (assigned to Union Oil) encouraged the use of carbonic acid. The present invention does not require the use of acids or caustic materials for solution mining of nahcolite.

Although U.S. Pat. No. 3,779,602 (assigned to Shell Oil Company) disclosed the possible use of low pressure steam at temperatures in excess of 250° F. and preferably in excess of 300° F., published test reports indicate that the process was not successful. The Shell process, which was designed to recover oil as well as nahcolite, resulted in solids precipitation causing plugging and "flow impairment." (See, e.g., M. Prats et al. "Soluble-Salt Processes for In-Situ Recovery of Hydrocarbons From Oil Shale," *Journal of Petroleum Technology*, 1078–88 (September, 1977).) The steam caused too much fracture of the oil shale formation and had too little water content to adequately dissolve the nahcolite. Moreover, the process was designed to decompose and recover hydrocarbons from the oil shale, impurities that would make it substantially more difficult and expensive to recover bicarb from the well production. Accordingly, commercial solution mining of nahcolite has traditionally been conducted at ambient or slightly elevated temperatures. For these reasons, steam is not used in the present process.

Prior to the present invention, it was generally believed that any increase in nahcolite solubility at elevated temperatures was so minimal that it did not justify the additional energy requirements associated with high temperature recovery of nahcolite. (See, Waldeck et al., "Aqueous Solubility of Salts at High Temperatures," 54 *J. Am. Chem. Society* 928 (March 1932) and Waldeck et al., "Aqueous Solubility of Salts at High Temperatures," 56 *J. Am. Chem. Society* 43 (January 1934) which report data for the solubility of nahcolite up to 392° F.) Indeed, the Waldeck data was generally believed to be the most authoritative statement on the solubility of nahcolite and its related carbonate compounds. Surprisingly, our work has demonstrated a much higher solubility for nahcolite at temperatures above 250° F.

Figure 5:
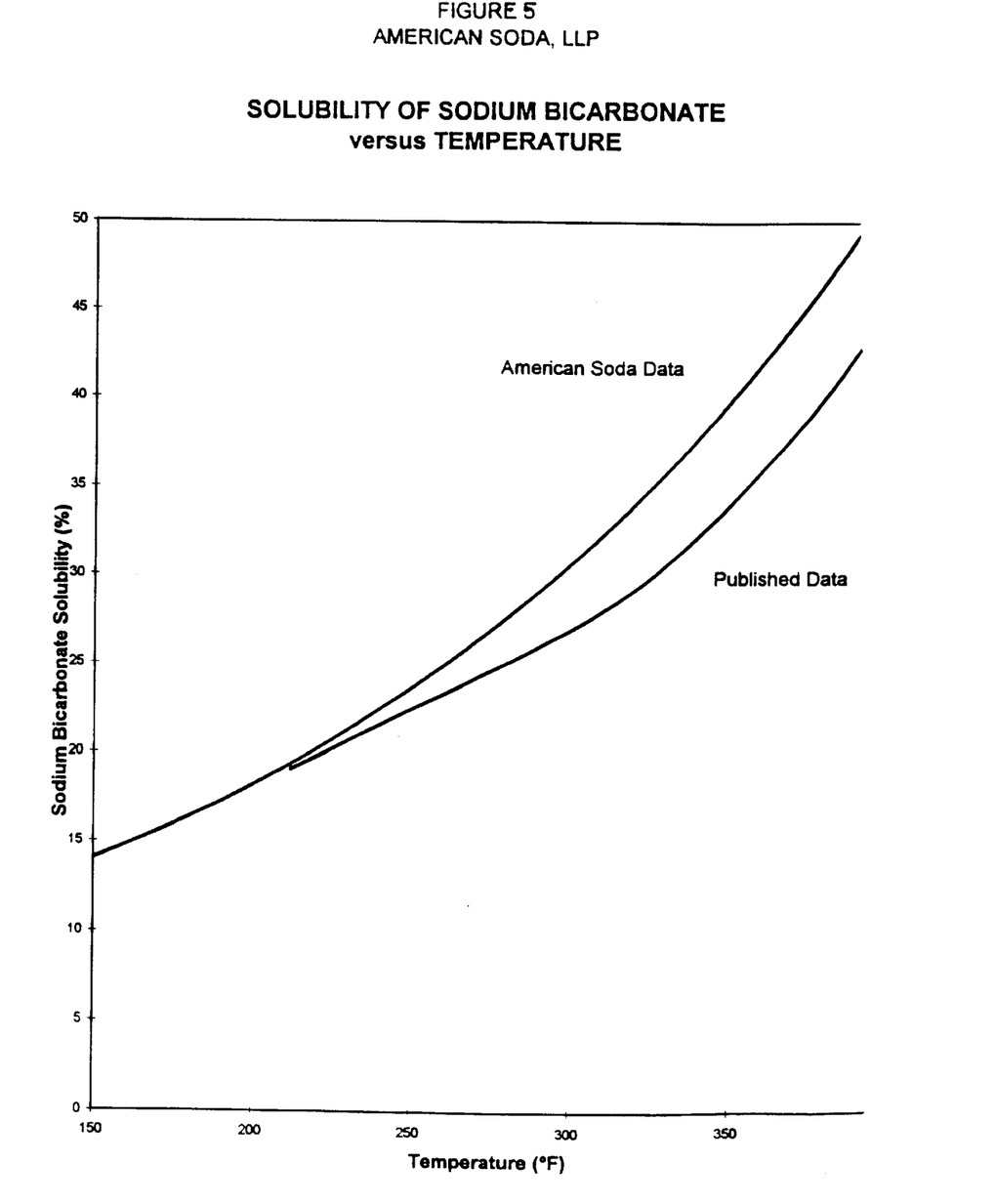
FIG. 5 is a chart showing Waldeck's published solubility of nahcolite in water compared to the solubilities we have now discovered.

It has now been discovered that the solubility of bicarb at elevated temperatures is much higher than that reported by Waldeck or predicted by extrapolating the Waldeck data above 392° F. For example, the published data indicates a solubility of about 27% for bicarb at 300° F., when in fact, the solubility is about 32% at that temperature. (The solubility percentages identified herein are based on weight.) The differences between Waldeck's published solubility information and the solubility we have found is illustrated in FIG. 5. As illustrated in FIG. 5, Waldeck's solubility curve and the actual solubility curve that we have found diverge, so that at higher temperatures, the difference is even greater. This discrepancy in the published and actual solubility has been confirmed by actual solution mining tests.

This surprising discovery led to the development of the present processes which permits (through the use of higher concentrations) the more efficient mining and production of sodium bicarbonate from nahcolite. Indeed, up to this time no one had contemplated the economical solution mining of nahcolite at the temperatures and pressures described herein.

Also, contrary to prior perceptions, it has been found that solution mining may be successfully conducted within nahcolitic oil shale intervals which contain nominally-horizontal beds of pure nahcolite and in intervals which contain both nodular and bedded nahcolite deposits. Shale fracturing can be controlled in either of these type of deposits to facilitate the solution mining of the nahcolite.

Contrary to published information (M. Prats, et al., supra), it has been found that the use of a hot aqueous phase solution mining process does not result in excessive fracturing and spalling. Solution mining of nahcolite in accordance with the present invention does not cause excessive "rubbling," i.e., disintegration of the shale rock into smaller pieces, which causes plugging of the mining cavity or the production tubing.

The present invention also utilizes pressure within the solution mining zone to prevent flashing of the mine solution, i.e., steam and carbon dioxide. Such flashing could potentially cause the decomposition of sodium bicarbonate and/or precipitation of the dissolved salts. To prevent flashing the mining zone is maintained at pressures up to the minimum hydraulic fracture pressure of the deposit being mined. This can be achieved by employing a pressurized cap of inert gas above the area of solution mining, as described more fully later, to maintain the pressure in the mining zone. Preferably, this blanket of inert gas is fed down the annulus between the injection pipe and casing. The pressure utilized for this inert gas cap is above that required to prevent flashing of the mining solution but below the minimum hydraulic fracture pressure. Alternatively, the pressure control can be accomplished by restricting the production solution flow.

Because the production solution exiting the mine is at high temperatures and pressures, the downstream processing is also novel. Prior to the present invention, commercial sodium bicarbonate had been crystallized generally at temperatures from the atmospheric boiling point to a low of about 140° F. (See, e.g., U.S. Pat. No. 4,815,790 to Rosar et al.) It has now been found that with the high quantity of bicarb in the high temperature production solution from the mine, the majority of the bicarb crystallization can be carried out very efficiently at temperatures above the atmospheric boiling point.

It has also been discovered that the high temperature production solution may contain a relatively large quantity of sodium carbonate ("soda ash") without appreciably altering the total alkali (i.e., the sodium carbonate and sodium bicarbonate) being carried by this solution. Again, the prior art (such as U.S. Pat. No. 4,815,790) teaches that the concentration of sodium carbonate should be limited or controlled (i.e., by keeping temperatures below 250° F.) to facilitate dissolution of the deposit and/or to prevent downstream operational costs and other problems.

The foregoing are but a few of the differences and advantages which the present invention has exhibited over the prior art. Other objects and advantages will become apparent to one skilled in the art from the description of the invention and drawings contained herein.

III. SUMMARY OF THE INVENTION

The present invention includes a method for solution mining nahcolite, capable of extracting nahcolite from geological formations containing deposits of lean oil shale as well as beds of essentially pure nahcolite, comprising: establishing at least one well; injecting hot water via a well into the formation, so that the water has a temperature of at least 250° F. in the formation: dissolving nahcolite in the hot water to form a production solution comprising water and sodium bicarbonate; and recovering the production solution from a well.

Another aspect of the invention includes the processing of the production solution to provide sodium bicarbonate, comprising: (a) crystallizing sodium bicarbonate from the mine production solution via multiple-stage crystallization; (b) removing the crystals from the solution (i.e., mother liquor); (c) drying the crystals to produce a sodium bicarbonate product; and (d) recycling the mother liquor to the solution mine.

Further refinements are provided in the detailed description and drawings provided herein.

V. DETAILED DESCRIPTION OF THE INVENTION AND THE PREFERRED EMBODIMENT

The present invention is described herein as it relates to the high temperature solution mining from discontinuous deposits of nahcolite contained in the nahcolitic oil shale of the Piceance Creek Basin of Colorado. This deposit contains lenses, nodules, and the like, as well as intermixed nominally horizontal beds of nearly pure nahcolite within the host shale. The quantity of nahcolite within the Piceance Creek deposit of nahcolitic oil shale normally varies between 18% and 40% with some variation on either side of these values. This includes beds of nearly 100% pure nahcolite which normally occur in horizontal layers and much leaner deposits of nahcolite embedded in the oil shale. These "lean nahcolitic oil shale deposits," for the most part, consist of lenses and nodules of nahcolite contained within the host oil shale rock, and include those nahcolitic deposits generally classified as embedded, nodules, crystal aggregates, and disseminated. The nahcolite content of this portion of the deposit is about 17 to 37%. A significant advantage of the present invention is that it is not limited to the recovery of bicarb from the beds of nearly pure nahcolite, but can be used to solution mine and recover these materials from the lean nahcolite deposits contained within oil shale.

Unlike prior art processes in which solution mining generally occurs laterally, i.e., horizontally, between one or more wells operating within a bed of pure nahcolite, solution mining via the present invention can be conducted vertically across a mining zone including one or more beds of pure nahcolite and/or layers of lean oil shale. In the preferred embodiment of the invention, high temperature, high pressure water (which may include recycled aqueous solution of bicarb and sodium carbonate) is injected in the top of the mining zone; the concentrated solution from the mining is recovered at a lower depth in the same well. Nahcolite is recovered from the beds of nahcolite and from the lean nahcolitic oil shale rock as the solution passes vertically downward and increases in concentration. As the mining continues, the mining area also expands laterally from the well.

While the foregoing describes a preferred mode of solution mining through a single well, the mining could also be conducted by adding the injection solution to a lower level and recovering the production solution at a higher geological elevation. Also, the addition of the injection solution and the recovery of the production solution can be alternated periodically to aid the mining process. Injection and production may also occur via different, but adjacent, wells if permitted by the formation or the stage of the solution mining in the geological formations involved.

This form of solution mining nahcolite is contrary to current thinking that discontinuities, i.e., areas of lean nahcolite concentration, in the deposit would inhibit the solution mining of the nahcolite. We have now found, however, that solution mining with water can be carried out efficiently if performed at the elevated temperatures and pressures of the present invention. There are several reasons for this: (a) the compressive strength of the host rock decreases with increasing temperatures; (b) the stress of the host rock increases with increasing temperatures; and (c) the solubility of nahcolite is far greater than originally expected at elevated temperatures.

As a result of factors (a) and (b) the introduction of high temperature water fractures the nahcolite containing oil shale. (See FIG. 4.) With rising temperatures, the strength of the host rock decreases and the stress increases—each to a point at which the two stresses become equal. At temperatures above this point, host rock breakdown (fracturing and spalling) is likely to occur. With the fracturing and spalling of the host rock, the solution mining water can reach additional soluble nahcolite nodules, lenses, and beds within the deposit.

Figure 4:
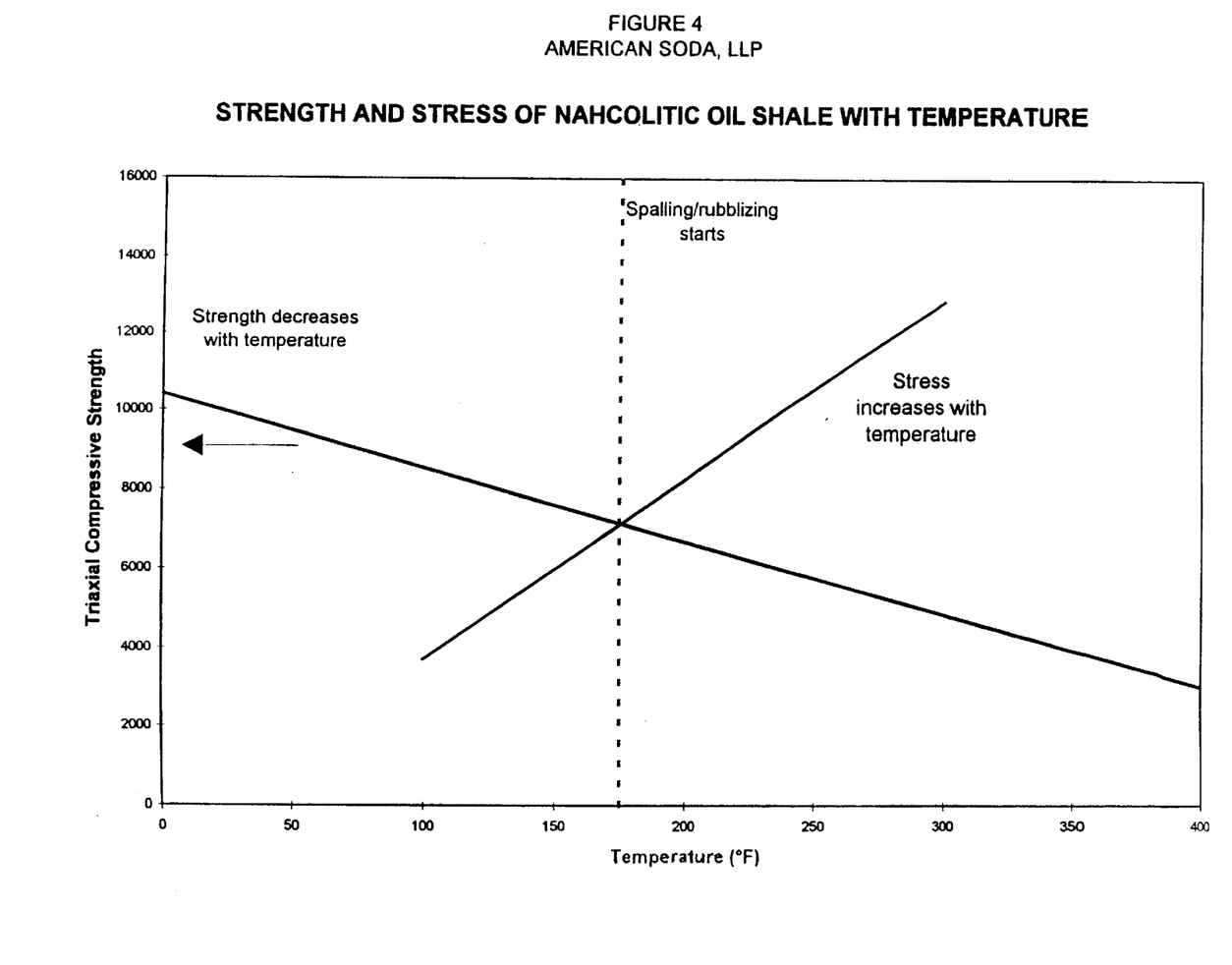
FIG. 4 show the relationship of compressive strength and stress of nahcolite oil shale with temperature.

The relationship of compressive strength and stress with temperature for one nahcolitic oil shale formation is shown in FIG. 4. At temperatures greater than about 175° F., the stress on the shale becomes greater than the capability of the shale to withstand it and fracturing and spalling occur. When the shale fractures, the lenses and nodules of nahcolite within the shale can be more readily accessed by the solution mining water. Also, both the vertical and horizontal access to nahcolite in nominally horizontal beds within the shale is increased due to the fracturing. As illustrated in FIG. 4, as higher temperatures are used for solution mining, there is greater potential for shale fracture. The temperature at which the nahcolitic oil shale in the Piceance Creek Basin will start to fracture normally occurs between 175° F. and 220° F.

The rate of solution of the soluble material within the mining zone is dependent on a number of variables including: degree of ore body fracturing, quantity of soluble material in the deposit, configuration of the soluble material in the deposit, dissolution face area, injection solution temperature, injection solution flow rate, concentration of soluble materials in the injection solution, production solution temperature, and potential soluble materials concentration in the production solution.

The quantity of nahcolite and its configuration throughout the well depth can be determined as the well is drilled. Using this information, the initial solution mining parameters may be determined for this one well. Of course, the quantity and configuration of the nahcolite may change as the mining moves away from the drilled well.

It has been found that the flow rate and temperature of the injection solution can be adjusted so as to control both the fracturing and production solution concentration. The degree of fracturing is dependent on both the injection temperature and the difference between the injection and production temperatures—in other words, the amount of heat given up by the injection solution during the solution mining. The injection temperature is the maximum temperature that any portion of the mining zone may reach, and the difference between the injection and production temperatures is a measure of how much heat is retained in the deposit surrounding the mining zone. Therefore, if more fracturing is desired, the temperature of the injection solution can be raised. For instance, if it is desired to maintain the dissolution of the same quantity of nahcolite per unit time but increase the concentration of bicarb in the production solution, the system can be changed by reducing the quantity of injection solution while, at the same time, increasing the temperature of the injection solution to maintain the original degree of heat input and fracturing in the mining zone. If it is desired to increase production rate of bicarb using the same flow rate of injection solution, the temperature of the injection solution can be increased to increase the fracturing and, therefore, the available nahcolite. With the use of high temperature water for solution mining, this method of control becomes eminently possible.

As an example, if the production solution were exiting the solution mine at 100 gpm, 300° F., and 22% bicarb with a 400° F. injection temperature, the conditions can be changed to 88 gpm and injection temperature of approximately 414° F. with the same production temperature to achieve 25% bicarb in the production solution. Conversely, with the injection rate and production temperature held constant, the injection temperature can be increased to approximately 414° F. to produce 100 gpm of production solution containing 25% bicarb.

As used herein, the following terms have the definitions indicated:

| | |
|---|---|
| Injection Solution | The barren aqueous solution sent to the solution mine at the solution mining temperature and pressure. |
| Production Solution | Solution recovered from the solution mining operation. |
| Mining zone(s) | The space(s) resulting from the dissolution of soluble salts into the injection solution. |
| Mining zone solution | Solution which has been injected into the mining zone prior to recovery as production solution. |
| Flashing | The loss of water vapor and carbon dioxide due to a system pressure less than that in equilibrium with the system temperature. |
| Tube or tubing | Piping between the land surface and the solution mining zone that carries injection solution or production solution. |
| Casing | Pipe through which the tubing is placed. |
| Grout | Material within the drilled well between the casing(s) and well perimeter. |
| Nahcolite | An ore containing primarily sodium bicarbonate (bicarb) as the water soluble salt. |
| Salt(s) | Inorganic compounds soluble in water. |

Figure 1:
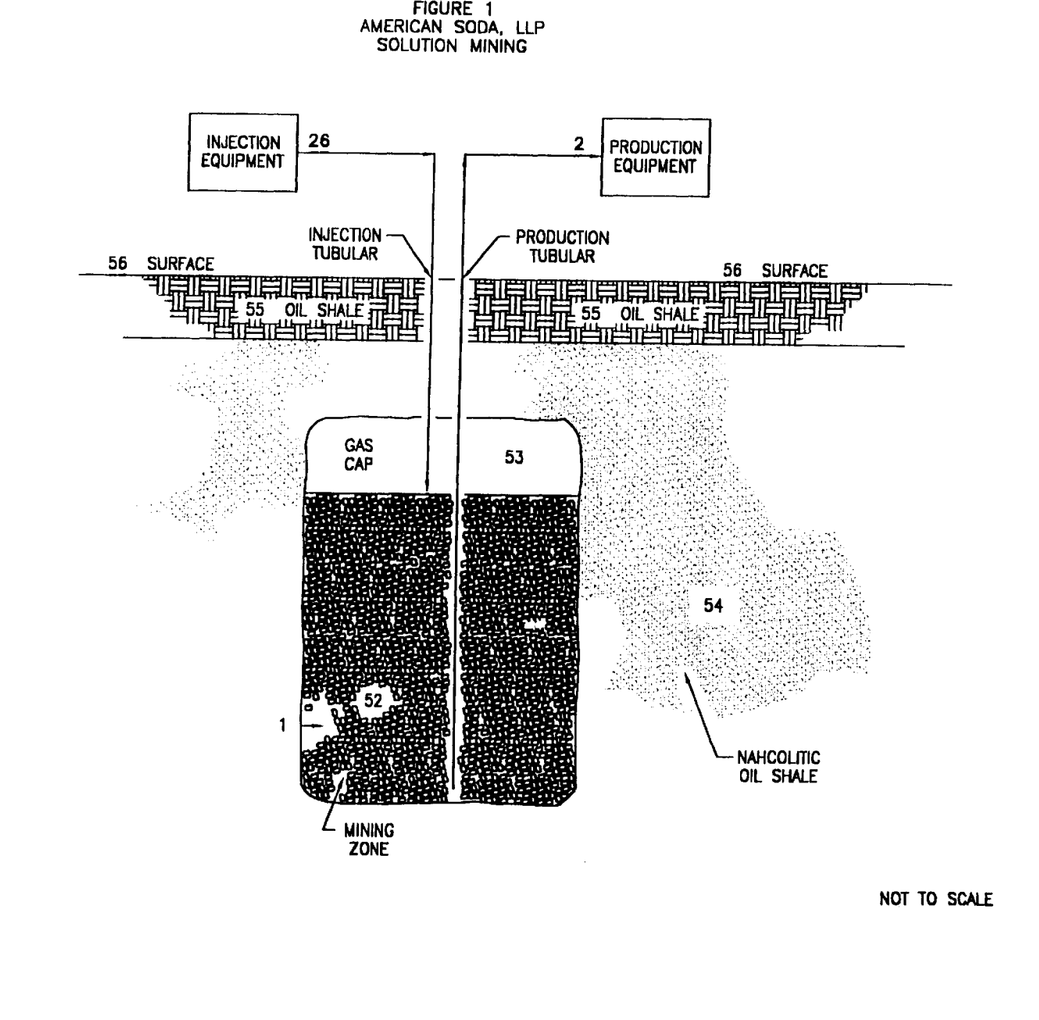
FIG. 1 is a schematic drawing showing the basic features of a preferred method of solution mining nahcolite at elevated temperatures and pressures.
Figure 2:
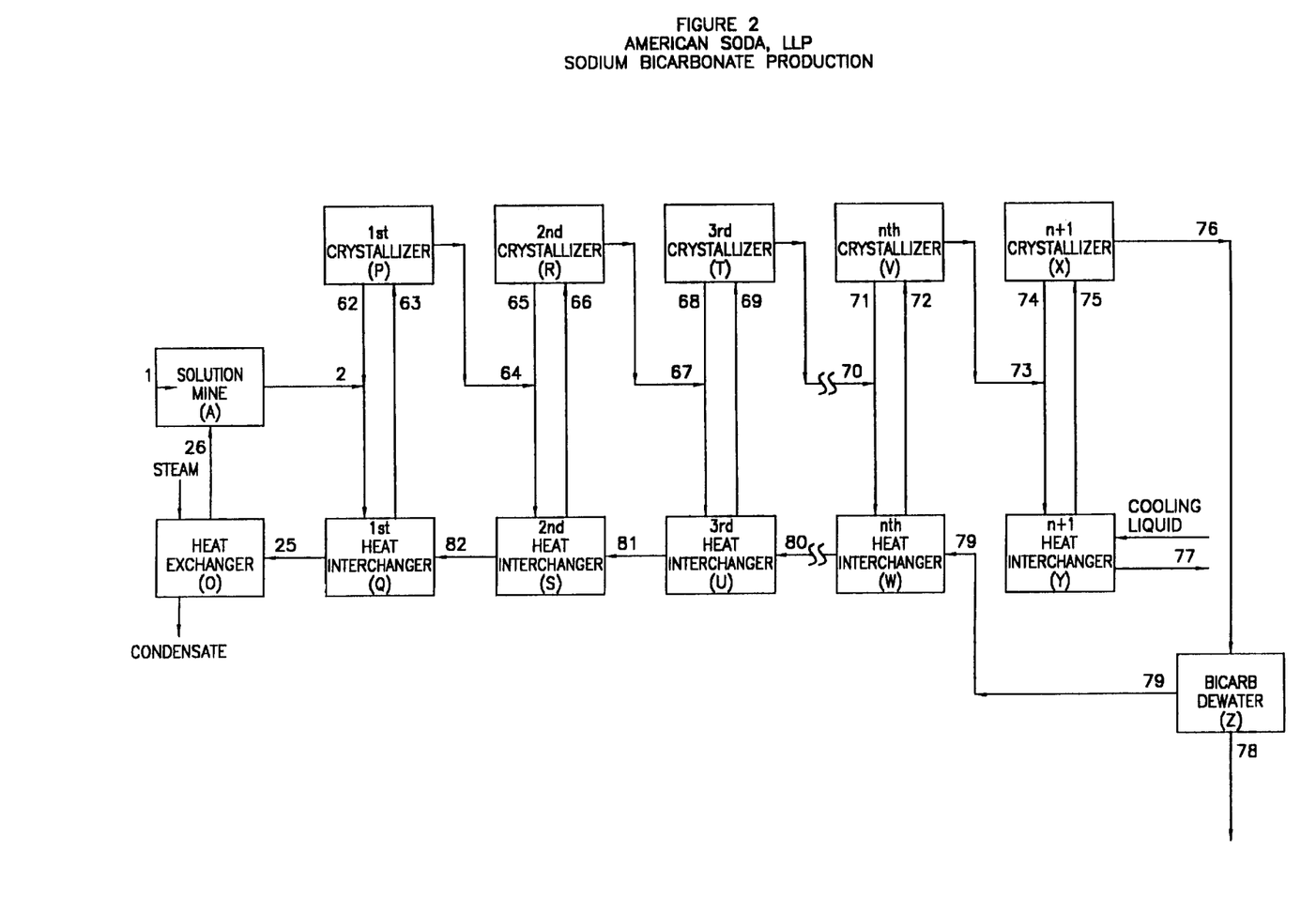
FIG. 2 is a schematic drawing showing the equipment (designated by letters) and process streams (designated by numbers) in the recovery of bicarb from the high temperature solution mining stream.

The present invention and a preferred embodiment thereof are described herein, first, with respect to in situ solution mining (Section A; FIG. 1) and, second, with respect to the recovery of sodium bicarbonate from the production solution (Section B; FIG. 2). Examples of the present invention are provided illustrating solution mining (i.e., Example 1) and recovery of bicarb from the production solution (i.e., Example 2).

Although the following description of the invention and the preferred embodiment are illustrated with reference to flows and operations shown in FIGS. 1 and 2, alternatives for certain process steps, equipment, and flow stream arrangements are also identified, and others may also be substituted by one of ordinary skill in the art with knowledge of the basic principles of this invention.

A. Solution Mining:

As illustrated in FIG. 1, nahcolite is dissolved at high temperatures and pressures from an underground deposit. Aqueous injection solution (26) is introduced into the solution mining zone (52) under pressure by the injection equipment with tubing extending from the surface (56) through an inert gas cap (55). Within the mining zone (52), nahcolite (1) within the nahcolitic oil shale (54) is dissolved in the aqueous mining zone solution. Production solution (2) is recovered from the mining zone and sent to the production equipment.

The ore zone of nahcolitic oil shale deposit in the Piceance Creek Basin is located 1,400 to 2,300 feet below the ground surface based on a ground elevation of 6,200 feet above mean sea level. The solution mining zone will normally be toward the bottom of the ore zone and will be 550 feet to 600 feet in depth. (See FIG. 3E where the solution mining zone is between 1,647 feet and 2,202 feet.) The ore zone contains about 18% to 40% nahcolite overall including beds of nearly pure nahcolite and lean nahcolitic oil shale. As the high temperature injection solution is introduced into the zone, fracturing and spalling of the insoluble oil shale takes place and soluble nahcolite is dissolved into the solution. The fracturing and spalling of the shale creates rubble that remains in the mining zone during the solution mining operation. Therefore, while the mined-out portion of the zone might be called a "cavity," in reality, the zone is filled with rubble. The diameter of the mining zone will vary from the diameter of the originally drilled well to over 200 feet at the completion of the mining.

In the 550 feet to 600 feet of depth of the mining zone, there are three main beds of nahcolite comprising a total of about 20–25 feet of depth. The remaining 530 to 580 feet of depth consists of nahcolite nodules surrounded by the shale. Over 87% to 90% of the nahcolite present in the deposit is in the form of nodules. The teachings of this patent illustrate a method of recovering the nahcolite in these nodules, and as a result, also the nahcolite within the beds.

The production solution (2) recovered in the solution mining of the nahcolite deposit will be between 175° F. and 550° F. Preferable ranges include 250° F. to 400° F. and, most preferable, 370° F. The production solution (2) will generally be between 30 psig and 700 psig, preferably 150 psig to 700 psig and, most preferably, 200 psig to 550 psig. The sodium bicarbonate content of this production solution will be between 12% and 70%, the latter being a theoretical upper limit which is difficult, if not impossible, to obtain due to the excessive pressures required to prevent flashing. In practice, the production solution will be preferably controlled between 15% and 47% and, most preferably, between 20% and 35%. The sodium carbonate concentration in the production solution is governed by the sodium carbonate content of the injection solution (26) and will usually be less than 10% and more preferably less than 5.5% by weight.

The solution mining process is operated to effect the efficient mining of nahcolite within mining zone (52) and to provide a production solution (2) that is suitable for the efficient recovery of bicarb. To this end, the temperature in the mine solution should exceed the minimum 175° F. that causes fracturing. Use of temperatures below 250° F., however, does not provide optimum fracturing and fails to take advantage of the increased solubility of nahcolite at high temperatures. Temperatures should not exceed 550° F. at which the organic portion of the oil shale deposit may start to release hydrocarbon gases or fluids that are undesirable in soda ash and bicarb recovery.

Figure 6:
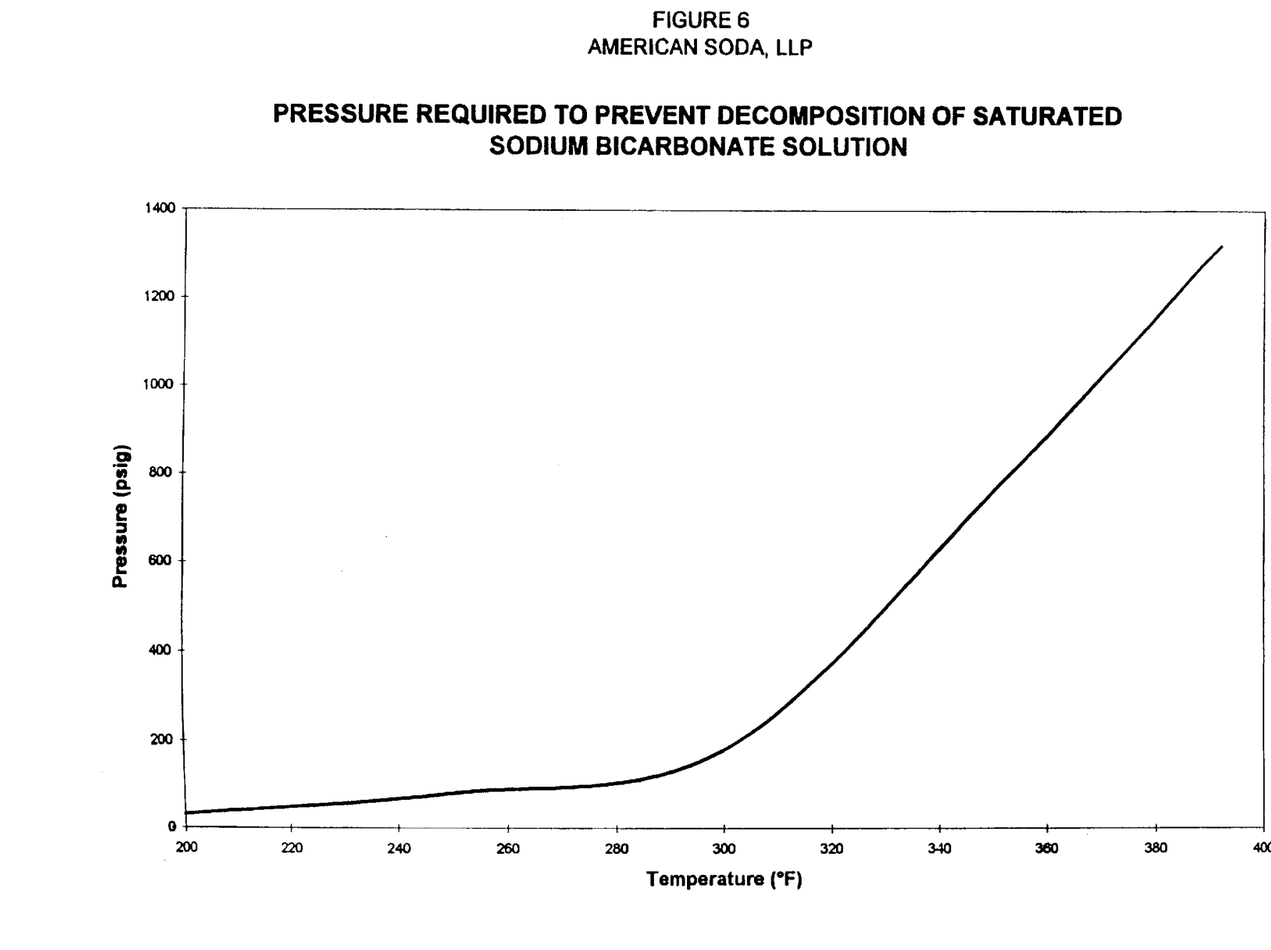
FIG. 6 is a chart showing the pressure required to prevent decomposition of saturated sodium bicarbonate in solution at various temperatures.

Solution mining, in accordance with the present invention, utilizes pressure within the solution mining zone to prevent flashing (i.e., the release of carbon dioxide and/or water vapor) within the mining zone. Such flashing could potentially cause the decomposition of sodium bicarbonate and/or precipitation of the dissolved salts. Therefore, the zone is maintained at pressures up to the minimum hydraulic fracture pressure of the deposit being mined. The minimum hydraulic fracture pressure of the nahcolitic oil shale within the Piceance Creek Basin formation is between approximately 975 psig and 1700 psig. FIG. 6 shows the pressure required to keep carbon dioxide in solution at a given temperature. The mining zone is operated at pressures above the curve shown in FIG. 6.

In addition, by maintaining a pressure within the mining zone in excess of the pressure in equilibrium with the aqueous solution temperature within the mining zone, no gas (i.e. water vapor or carbon dioxide) forms. Accordingly, there is no requirement to vent accumulated gases. The absence of gaseous carbon dioxide minimizes corrosion within the production tubing. The mining zone pressure is monitored by noting the pressure of the inert gas blanket (53).

The injection solution pressure required is that necessary to overcome the piping friction to and from the mining zone, the mining zone resistance, and the specific gravity influence between the injection and production solutions, plus a pressure greater than that required to prevent flashing between the injection equipment and the production equipment. By supplying an injection pressure of this magnitude, there is no need for a gas lift system in the production tubing to recover mining solution. By not introducing gas lift into the system, an additional favorable attribute results. Corrosion within the production tubing is less severe due to single phase flow and the absence of water vapor and carbon dioxide in a gas phase.

The aqueous injection solution may contain soluble salts, e.g. sodium bicarbonate, sodium carbonate, sodium chloride, etc. These salts may be contained in the injection solution due to the purging and recycling of solutions into the injection solution from systems recovering alkali from the production solution. Concentrations of sodium bicarbonate and sodium carbonate may be as high as 10% each. Of course, the dissolving potential of the injection solution is reduced if it contains soluble salts.

Injection equipment, such as, an injection pump(s) capable of supplying the pressure are required. The production equipment can include booster pumps to impart any extra pressure required to prevent flashing prior to production solution processing. Alternately, a booster pump(s) may be of the submerged type and may be placed at any point within the production tubing or return piping.

The design of the solution mining wells is very important, due to the high pressures of the injection and production solutions and the requirement to transfer large amounts of heat efficiently to the nahcolite containing shale oil deposit. (FIGS. 3A through 3E.) Each solution mining well drilled must include a seal (i.e., "grout") to prevent intrusion of ground water into the annulus between the casing and ground. The grout seals the mining zone from the surface, prevents ground water from reaching the surface, prevents ground water from entering the solution mining zone, prevents ground waters from intermixing, and prevents solution mining solutions from mixing with ground water. Accordingly, the grout preferably extends continuously from the surface level to the top of the deposit being mined.

For the solution mining, as described herein, where the temperatures of the solutions are above the atmospheric boiling point, it is imperative that the grout construction include insulating properties for energy conservation and the maintenance of the high solution mining temperatures. Therefore, the composition of the grout material is extremely important. It has been found that the grout may consist of cement with perlite, fly ash, coal clinker, oil shale clinker, light weight aggregate, spherelite, or other insulating filler; urethane based material; or other material of the proper strength and consistency(s) to completely seal the annulus and provide good insulating properties. The thickness of the grout between the casing and the surrounding rock is also important and is determined by the insulating quality of the grout material and the heat loss that can be tolerated. A typical grout may consist of 34% cement, 33% silica flour, and 33% spherelite beads.

In order to accomplish the high temperature solution mining, the tubing configuration is also important. With improper tubing design, heat may be lost to the surrounding rock and/or to other tubing members.

Figure 3A:
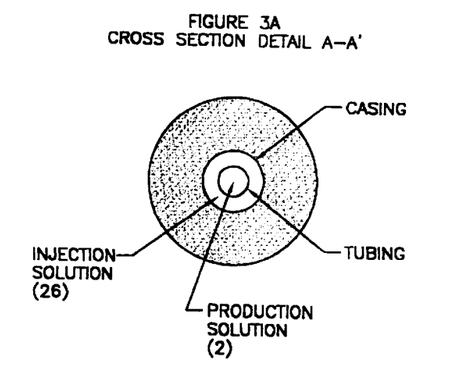
FIGS. 3A through 3E illustrate pipe or tubing configurations that can be used in the solution mining processes of the present invention.
Figure 3B:
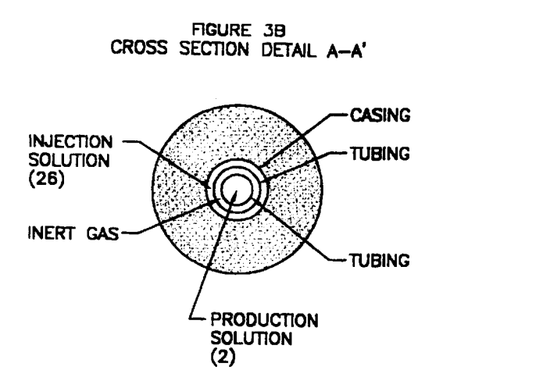
Figure 3C:
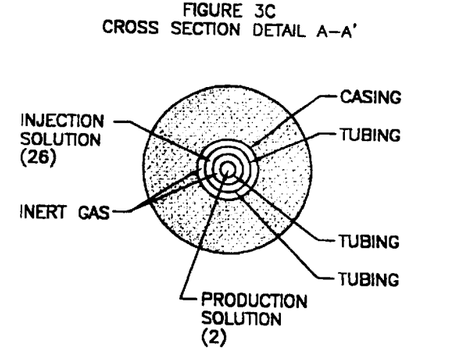
Figure 3D:
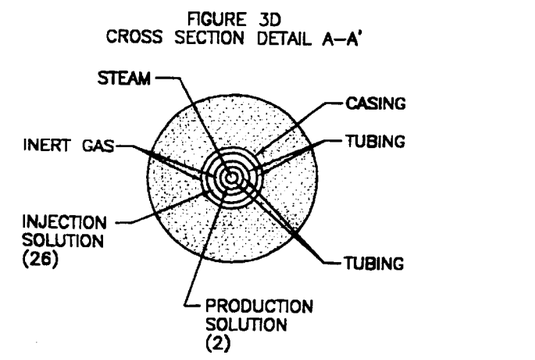

The most simple means of accomplishing the transfer of solution from the surface to the solution mining zone and return to the surface is by two concentric pipes. (FIG. 3A.)

This is certainly a method that can be used in the solution mining of nahcolite. The injection solution can be in either the center pipe or in the outside pipe with the latter configuration being the more desirable since the concentrated production solution will be less likely to lose heat and precipitate sodium bicarbonate. The drawback to the two pipe system is that the injection solution is cooled as it flows to the mining zone, thereby, causing less oil shale fracturing and less sodium bicarbonate solubilization.

A more preferable tubing configuration is to provide three (FIG. 3B), four (FIG. 3C), or five (FIG. 3D) concentric pipe configurations. For a three pipe configuration, the center pipe would carry the production solution, the annular space between the center pipe and outside pipe would contain an inert gas consisting or nitrogen, helium, hydrogen, methane, or the like. This would provide insulation between the outside pipe carrying the injection solution and the production solution. This configuration is better than the two-pipe configuration as the temperature of the injection solution is higher when it reaches the mining zone. Greater mining zone temperatures result in greater oil shale fracturing and greater water-soluble salt concentrations in the production solution. However, with the three-pipe configuration, some heat would be lost from the injection solution to the grout.

The four-pipe configuration (FIG. 3C) is similar to the three-pipe configuration except that an additional inert gas insulating pipe is provided between the injection solution pipe and the grout, thus reducing the amount of heat lost to the ground and aquifers through the grout. Another configuration would include a fifth pipe inside the production solution pipe (FIG. 3D) that would carry steam or hot water to insure that the production solution did not cool to the point of crystal precipitation as it rose to the surface.

Figure 3E:
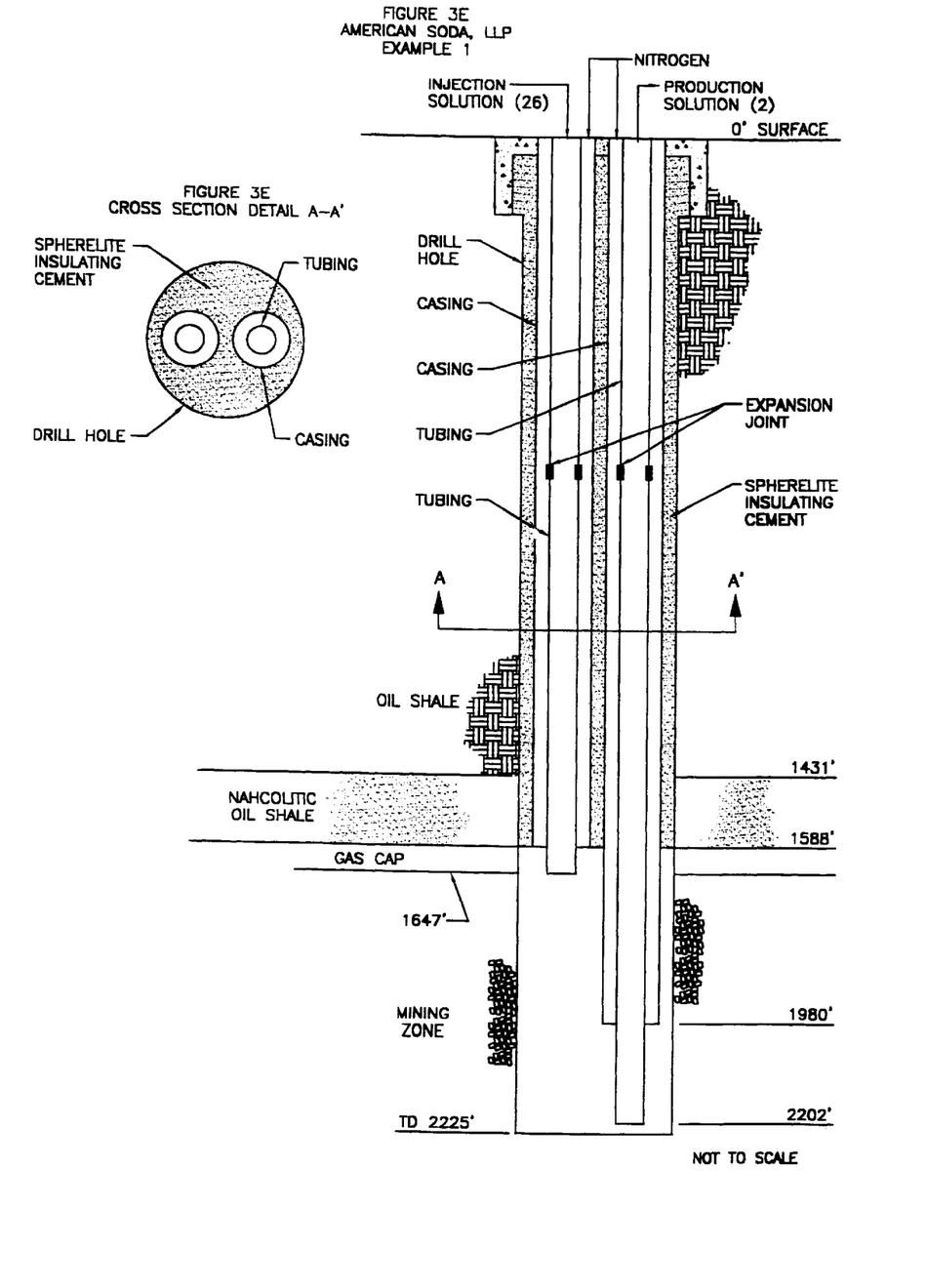

Additionally, the injection and production tubing may be separated. (FIG. 3E.) The injection pipe is contained within a pipe (casing) containing an insulating gas; both, of which, are contained in a grout. The production pipe is contained within a pipe (casing) containing an insulating gas; both, of which, are contained in the same grout as the injection tubing. Again, a pipe containing steam or hot water may be included within the production pipe.

Depending on the stresses of the tubing due to temperature, length, and pipe specifications, one or more expansion joints may be included in each tubing.

All of the above described well descriptions are designed to prevent heat loss as the injection and production solutions move through the well.

The upper mining zone limit as well as the shape of the mining zone, to some extent, is controlled by the use of a nitrogen gas pad. However, any inert gas will work. "Inert gas" is defined as one that will not react with the well solution at the design temperature and pressure. Gases that could be used (but not limited to) are nitrogen, helium, hydrogen, methane, carbon dioxide, and others. The gas pad volume (height) is controlled by injecting or removing gas from the mining zone through the gas annulus surrounding the injection solution pipe.

B. Recovery of Bicarb:

An advantage of the solution mining process of the present invention is that it provides a production solution that is free of impurities, such as, organics (e.g., oil and other hydrocarbons) and containing minimal amounts of salt, i.e., sodium chloride. Accordingly, processing of the production solution to produce bicarb does not require preliminary procedures to remove these impurities, e.g., solids filtration and carbon absorption treatments. In contrast to prior art processes, the present invention is capable of producing an essentially clear production solution free of solids.

The process of the present invention can be illustrated by reference to the operations and flow streams depicted schematically in FIG. 2. Production solution (2), produced in a solution mine at elevated temperatures (e.g., 250° F. to 550° F., preferably 270° F. to 340° F.) and pressure (e.g., 150 psig to 700 psig), enters the sodium bicarbonate crystallization system into, most usually, a circulation stream (62) of a first crystallization stage. The production solution (2) will contain between about 12% to 70% sodium bicarbonate, more preferably between about 15% to 47% bicarb and most preferably, between about 20% to 35% bicarb. This circulation stream (62) flows through a first heat interchanger (Q) in which the temperature of the circulation stream is reduced. The circulation stream (63) flows from the interchanger into a crystallizer (P). The crystallizer may be any one of several types available commercially. However, the physical construction of the unit must be such as to withstand the elevated pressures at which the crystallizer is operated without incurring damage.

There are several constraints required for the proper operation of the interchanger (Q) and crystallizer (P). The temperature of the crystallizer must be maintained at a point lower than the feed solution (2) however not so low that excessive supersaturation occurs. The difference in temperatures between feed stream (2) and exit stream (64) of the crystallizer determines the quantity of sodium bicarbonate that will precipitate in the crystallizer. If that difference is too great, causing excessive supersaturation, the crystal size of the sodium bicarbonate will be small. Assuming that small crystal size is not a concern to customers, there is no problem. But if large crystals are an important sales consideration, the temperature difference must be adjusted accordingly.

Based on the sodium bicarbonate saturation-verses-temperature curve (FIG. 5) it can be seen that the rate of solubility increases with temperature. Therefore, the temperature difference between the feed solution and exit solution in each stage of a multistage crystallizer system will normally be less in the earlier stages and larger in the latter stages in order to maintain the same supersaturation per stage. This is not particularly important in existing sodium bicarbonate production operations where crystallization is carried out at comparatively low temperatures in which only one to three stages are required.

The exit stream from the first crystallization stage (64) enters the circulation stream of the second stage crystallizer (65). Like the first stage crystallizer, this circulation stream (65) flows through a heat interchanger (S) and back (66) into the second stage crystallizer body (R). The cooling considerations of this circulation stream are the same as that for the first stage crystallizer circulation steam. Exit streams from subsequent stages, e.g. (67), (70) and (73), have like entries into the circulation steams of successive crystallizer stages. These circulation streams also effect cooling of the incoming stream by heat interchange.

The pressure of each succeeding stage of crystallization will be less than that of the previous stage. The pressure in each stage will normally be that pressure in equilibrium with the temperature of the stage. However, the pressure of each stage may be maintained higher than the equilibrium temperature if so desired. This can be accomplished by injecting a gas most usually carbon dioxide, into the crystallizer.

The quantity of the initial mined solution and the sodium bicarbonate concentration in that solution will dictate the number of crystallization stages required, because each stage is limited by physical equipment size rather than chemical processing parameters. As previously noted, the supersaturation of each stage must be controlled to achieve the proper growth of large crystals (i.e., greater than 50 micron and preferably greater than 100 micron). Therefore, if the flow of the feed solution to each stage is large, the circulation stream at that stage must also be large. In fact, in order to maintain the proper supersaturation, the circulation stream must be many times larger than the feed stream. At some point, the size of the pumps and/or heat interchangers required to effect the desired supersaturation exceeds the conventional sizes commercially available—even if several circulation streams are utilized per stage.

Likewise, if the mined solution is at higher temperatures and higher sodium bicarbonate concentrations, greater circulation-to-feed ratios are required at each stage to maintain the desired supersaturation. This may also require more stages to fully recover the sodium bicarbonate from the feed solution.

Assuming that sufficiently large equipment is available, approximately five stages of crystallization are required to recover the sodium bicarbonate from an initial mined solution having less than about 25% sodium bicarbonate. However, additional stages may be required if equipment of the requisite size cannot be obtained.

In FIG. 2, the penultimate stage (V) in the series is indicated as the "nth" stage and the last stage (X) is then "n+1." The discharge from stage n (73) is fed to the circulation stream of stage n+1 (74). This circulation stream is cooled to the final and lowest temperature of the system by suitable cooling fluid, e.g. cooling tower water, plant water, ambient air, chilled water, etc.

Sodium bicarbonate crystals (78) are recovered from the discharge from crystallization stage n+1 (76) with the solution (79) being recycled through the heat interchangers of each stage. This serves both to cool each stage and to heat the recycle solution. The final solution (25) after passing through the heat interchangers (W, U, S, and Q) is heated further to the desired mine injection temperature in a steam heated exchanger (O) and sent (26) to the solution mine (A). In some cases, it may be prudent from an energy, or other standpoint, to allow the recycle solution to bypass one or more of the interchangers. In this case, a suitable cooling fluid, as described above, may be used in the bypassed heat interchangers. The injection solution (26) may contain some sodium carbonate (less than 10% and preferably less than 5.5%) in addition to bicarb not removed by the crystallization.

Crystals may be recovered after any or all stages prior to sending the discharge solution to succeeding stages. Also, the crystal-containing discharge from each stage may be subjected to a system, such as a liquid cyclone system, in which crystals having the desired product size range are removed while allowing crystals outside of this range to flow to the succeeding stage with the solution. These removed crystals could be combined with the final product recovery (78), or handled separately.

The sodium bicarbonate crystals recovered from this crystallization system may be dried and marketed as sodium bicarbonate. Alternately, all or part of the sodium bicarbonate may be calcined to light ash (sodium carbonate); all or part of which may be converted to dense soda ash (also sodium carbonate).

The addition of carbon dioxide may be required in one or more of the stages to insure that the only crystal form produced is sodium bicarbonate. Also, water may be added to the system to replace any water lost.

VI. EXAMPLES

Example 1

This example illustrates the high temperature solution mining of nahcolite.

The techniques described herein are utilized effectively in the solution mining of nahcolite from the nahcolitic oil shale deposits in the Piceance Creek Basin of western Colorado. These deposits, for the most part, consist of lenses and nodules of nahcolite contained within an oil shale host rock. The nahcolite content of this portion of the deposit is 18% to 40%. There are also several, nominally-horizontal beds of varying thickness of nahcolite within the deposit.

A well is drilled into a nahcolitic oil shale, as shown in FIG. 3E, with the mining zone extending from 1647 feet below the ground surface (where injection solution is inserted into the formation) to 2202 feet (where the production solution is recovered), i.e., a vertical separation of 555 feet. The average nahcolite concentration over the mining zone is 22%, of which, 91.2% is contained in nodules within the oil shale and 8.8% is contained in beds. The total depth of the three beds within the mining zone is about 21 feet.

When a 400° F. aqueous solution (26) is injected into the deposit, not only will the hot solution be able to carry high concentrations of bicarb, the shale within the deposit will fracture and spall so as to render additional nahcolite available for dissolution.

For this example, the configuration of the injection and production piping consists of an injection pipe contained within a pipe (casing) containing a nitrogen gas; both, of which, are contained in a spherelite-cement grout, as identified previously, extending the full length of the well. The production pipe is contained within a pipe (casing) containing a nitrogen gas; both, of which, are contained in the same grouted well as the injection piping. (See FIG. 3E.) Nitrogen gas injected through the annulus of the injection pipe is used to form a gas blanket of approximately 60 foot gas blanket above the mining zone.

A mining field is established with thirteen wells as described above. Injection solution (26), at 667 tph and containing approximately 2.2% soda ash and 1.3% bicarb at 400° F. and 711 psia, is introduced into the injection piping for the thirteen wells at the surface. This injection solution flows through the injection pipe to the top of the mining zone, flows downward through the mining zone to the production pipe intake, and through the production solution pipe to the surface (2), and thence to solution processing as described in Example 2.

As the solution flows downward through the mining zone, a portion of its heat is utilized to fracture the oil shale, a portion of the heat is also lost as the solutions travels to and from the mining zone (circa 2° F.), and a portion is lost as the nahcolite is dissolved (circa 2° F.). Most of the heat content is retained in the solution to insure the dissolved bicarb will remain so. A production solution (2) containing 25% bicarb is recovered from the operation at 300° F. in the mining zone. The following table shows the material balance for the indicated streams:

|  | Flow Rate (tph) | | | |
| --- | --- | --- | --- | --- |
|  | Total | Soda Ash | Bicarb | Water |
| Injection Solution (26) | 667 | 15 | 9 | 643 |
| Leached from Deposit (1) | 184 | — | 184 | — |
| Retained Solution | 85 | 2 | 1 | 81 |
| Production Solution (2) | 767 | 13 | 192 | 562 |

As the nahcolite (bicarb) is dissolved, the volume originally occupied by the bicarb is replaced by solution. Therefore, as 184 tph of bicarb is dissolved (1), 85 tph of solution takes its place.

The fact that the heat carried by the injection solution for this example was enough to fracture the nahcolitic oil shale to the extent that a production solution containing 25% bicarb was produced does not mean that the same heat input into another well having the same characteristics will result in an identical bicarb concentration. in the production solution. The shale and nahcolite nodules may be arranged differently. Each well will have its own heat input/bibicarb production concentration characteristics.

Example 2

This example illustrates the recovery process shown in FIG. 2.

The process of the present invention, as described in FIG. 2, may be conducted under the following process parameters:

| | |
|---|---|
| Temperature of production solution feed (2) | 300° F. |
| Rate of production solution feed (2) | 767 tph |
| Sodium bicarbonate concentration in feed (2) | 25% |
| Number of stages | 5 |
| Temperature of the last stage | 100° F. |

This example assumes a feed rate of approximately 767 tons per hour with a sodium bicarbonate content of 25% and utilizes five stages of equipment of a size believed to be commercially available.

The material balance of the system is:

| Stage | Feed Rate (tph) | Temp. (° F.) | Crystals Produced (tph) | Discharge Rate (tph) |
|---|---|---|---|---|
| 1 | 767 | 240 | 14.0 | 767 |
| 2 | 767 | 205 | 28.4 | 767 |
| 3 | 767 | 170 | 25.0 | 767 |
| 4 | 767 | 135 | 22.6 | 767 |
| 5 | 767 | 100 | 20.3 | 767 |
| To Dewater | 767 | 100 | 110.3 | — |
| Wet Product (78) | 119 | 100 | — | — |
| Dewater Sol'n (79) | 648 | 100 | — | — |
| Make-up Water (add to stream 26) | 8.7 | — | — | — |

If, however, the feed rate were increased to 2000 tph or the sodium bicarbonate content were increased to 50%, then as many as 10–12 stages would be required to create the same supersaturation potentials in each stage, because of equipment size limitations.

This example also assumed an equal temperature decrease in each stage. This assumption would result in unequal crystal production in each stage because the solubility of sodium bicarbonate is not a straught line when plotted against temperature. The system may be designed for equal crystal production in each stage. In that case there would be unequal cooling in each stage.

Also, in this example, it was assumed that carbon dioxide need not be added. In actual operation, there may be some decomposition of sodium bicarbonate requiring the addition of carbon dioxide in each stage.

Example 3

As another example using multiple stages of crystallization as illustrated in FIG. 2, and by using a saturated feed at a temperature of 350° F., approximately sixty percent more sodium can be produced using approximately fifty-seven percent of the feed volume utilized in Example 2. With feed temperatures greater than 350° F., even greater production per unit volume of feed can be attained.

The foregoing description, drawings and examples illustrate the principles of the invention and a preferred embodiment. Various changes and modifications apparent to one skilled in the art may be made within the spirit of the invention.

We claim:

1. A process for the recovery of sodium bicarbonate from a hot aqueous solution of sodium bicarbonate having a temperature of at least 250° F. comprising:
   a. subjecting the hot aqueous solution of sodium bicarbonate to multiple-stages of crystallization to produce crystals of sodium bicarbonate and at least one stream of mother liquor, wherein the majority of the crystallization is conducted at temperatures above the atmospheric boiling point of the solution being subjected to crystallization, and
   b. subjecting at least part of the sodium bicarbonate crystals to at least one process selected from the group consisting of dewatering and drying.

2. The process of claim 1 wherein the hot aqueous solution is essentially clear, is free of solids and organics and contains minimal amounts of salt.

3. The process of claim 1 wherein the hot aqueous solution is at a temperature of from 250° F. to 550° F.

4. The process of claim 1 wherein the hot aqueous solution of sodium bicarbonate is at a temperature of from 270° F. to 340° F.

5. The process of claim 1 wherein the hot aqueous solution of sodium bicarbonate is at a pressure of from 150 psig to 700 psig.

6. The process of claim 4 wherein the hot aqueous solution of sodium bicarbonate is at a pressure of from 150 psig to 700 psig.

7. The process of claim 1 wherein the hot aqueous solution of sodium bicarbonate is at a pressure sufficient to prevent the flashing of carbon dioxide.

8. The process of claim 1 in which the crystallization is not preceded by solids filtration and carbon absorption.

9. The process of claim 1 wherein the hot aqueous solution contains between about 12% to 70% sodium bicarbonate.

10. The process of claim 1 wherein the hot aqueous solution contains between about 15% to 47% sodium bicarbonate.

11. The process of claim 1 wherein the hot aqueous solution contains between about 20% to 35% sodium bicarbonate.

12. The process of claim 1 wherein the hot aqueous solution contains less than 10% sodium carbonate.

13. The process of claim 1 wherein the hot aqueous solution contains less than 5.5% sodium carbonate.

14. The process of claim 1 wherein the crystallization is conducted in 5 or more stages.

15. The process of claim 1 wherein the pressure of each succeeding stage of crystallization is less than that of the previous stage.

16. The process of claim 2 wherein the pressure of each succeeding stage of crystallization is less than that of the previous stage.

17. The process of claim 1 wherein the pressure of at least one stage is maintained above that in equilibrium with the temperature in that stage by the injection of pressurized gas into that stage.

18. The process of claim 15 wherein the pressure of at least one stage is maintained above that in equilibrium with the temperature in that stage by the injection of pressurized gas into that stage.

19. The process of claim 17 wherein the gas is carbon dioxide.

20. The process of claim 18 wherein the gas is carbon dioxide.

21. The process of claim 1 wherein supersaturation in the crystallization stages is controlled to produce sodium bicarbonate crystals greater than 50 micron.

22. The process of claim 21 wherein the supersaturation is controlled by cooling.

23. The process of claim 1 wherein supersaturation in the crystallization stages is controlled to produce sodium bicarbonate crystals greater than 100 micron.

24. The process of claim 23 wherein the supersaturation is controlled by cooling.

25. The process of claim 24 wherein bicarbonate crystals are removed from each crystallization stage prior to sending the discharge solution to the succeeding stage.

26. The process of claim 24 wherein bicarbonate crystals are removed from one or more of the crystallization stages prior to sending the discharge solution to the succeeding stage.

* * * * *